United States Patent
Gardner et al.

(10) Patent No.: US 11,982,585 B2
(45) Date of Patent: May 14, 2024

(54) SYSTEM AND METHOD FOR STRAIN AND ACCELERATION BASED ANALYTICS IN AN INDEPENDENT CART SYSTEM

(71) Applicant: Rockwell Automation Technologies, Inc., Mayfield Heights, OH (US)

(72) Inventors: Eric M. Gardner, Milwaukee, WI (US); Shankernarayan Ramanarayanan, Eden Prairie, MN (US); Tamil K. Rajavel, Carver, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 419 days.

(21) Appl. No.: 17/482,746

(22) Filed: Sep. 23, 2021

(65) Prior Publication Data
US 2023/0085908 A1 Mar. 23, 2023

(51) Int. Cl.
*H04B 17/309* (2015.01)
*G01L 5/00* (2006.01)
*G01L 5/04* (2006.01)

(52) U.S. Cl.
CPC .......... *G01L 5/0019* (2013.01); *G01L 5/0028* (2013.01); *G01L 5/042* (2013.01)

(58) Field of Classification Search
CPC ...... G01L 5/0019; G01L 5/0028; G01L 5/042
See application file for complete search history.

(56) References Cited

U.S. PATENT DOCUMENTS

| | | | |
|---|---|---|---|
| 7,486,182 B2 | 2/2009 | Hahn et al. | |
| 7,890,194 B2 | 2/2011 | Pannese | |
| 9,673,685 B2 | 6/2017 | Cooper et al. | |
| 10,135,705 B2 | 11/2018 | Asenjo et al. | |
| 10,432,117 B1 | 10/2019 | Huang et al. | |

(Continued)

FOREIGN PATENT DOCUMENTS

| | | |
|---|---|---|
| CN | 110595775 A | 12/2019 |
| EP | 2592515 A2 | 5/2013 |

(Continued)

OTHER PUBLICATIONS

Extended European Search Report dated Feb. 17, 2023; Application No. 22196127.9—(8) pages.

*Primary Examiner* — Muhammad S Islam
(74) *Attorney, Agent, or Firm* — Boyle Fredrickson, S.C.

(57) ABSTRACT

A system and method of monitoring forces exerted at multiple locations on a mover includes multiple sensors, where each sensor is mounted at one of the locations. Each sensor detects an operating condition of the mover at the location on the mover at which it is mounted. The sensors may include accelerometers, strain gauges, or a combination thereof. Each strain gauge is mounted proximate to an area of interest on the mover. Each strain gauge generates a feedback signal corresponding to a deformation of the material measured at the location of the sensor. From the measured deformation of material, a force acting on the mover at the location of the sensor may be determined. The forces exerted at the different locations on the mover may be monitored in real time to determine bearing performance or monitored over a duration of time to observer changes in bearing performance over that duration.

20 Claims, 14 Drawing Sheets

(56) References Cited

U.S. PATENT DOCUMENTS

| | | | |
|---|---|---|---|
| 10,488,282 B2 | 11/2019 | Guru et al. | |
| 10,586,254 B2 | 3/2020 | Singhal | |
| 10,678,233 B2 | 6/2020 | Cella et al. | |
| 10,712,738 B2 | 7/2020 | Cella et al. | |
| 10,717,643 B2 | 7/2020 | Yee et al. | |
| 10,866,584 B2 | 12/2020 | Cella et al. | |
| 2003/0121333 A1* | 7/2003 | Smith | G01L 5/0028 |
| | | | 73/796 |
| 2014/0025256 A1 | 1/2014 | Armitage et al. | |
| 2014/0067289 A1 | 3/2014 | Baldwin | |
| 2014/0074433 A1 | 3/2014 | Crepet | |
| 2019/0033846 A1 | 1/2019 | Cella et al. | |
| 2019/0061558 A1 | 2/2019 | Craver | |
| 2019/0250069 A1 | 8/2019 | Samadani et al. | |
| 2019/0298084 A1 | 10/2019 | Billings et al. | |
| 2020/0132149 A1 | 4/2020 | Chandrasekara et al. | |

FOREIGN PATENT DOCUMENTS

| | | |
|---|---|---|
| EP | 2801938 A1 | 11/2014 |
| EP | 2841781 B1 | 1/2018 |
| EP | 3299317 A1 | 3/2018 |
| EP | 3628605 A1 | 4/2020 |
| WO | 2017196821 A1 | 11/2017 |
| WO | 2020036818 A1 | 2/2020 |
| WO | 2020097562 A1 | 5/2020 |

\* cited by examiner

SYSTEM AND METHOD FOR STRAIN AND ACCELERATION BASED ANALYTICS IN AN INDEPENDENT CART SYSTEM

BACKGROUND INFORMATION

The subject matter disclosed herein relates to a system and method for monitoring vehicle health for an independent cart system. More specifically, multiple sensors, such as strain gauges and accelerometers are mounted to different locations on a vehicle to provide performance and health of the vehicle or subsystems on the vehicle at the different locations.

Motion control systems utilizing independent carts and linear motors can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled vehicles or carts, also referred to herein as "movers", each supported on a track for motion along the track. The track is made up of a number of track segments, and a linear drive system controls operation of the movers, causing the movers to travel along the track. Sensors may be spaced at fixed positions along the track and/or on the movers to provide information about the position and speed of the movers.

Numerous differences between different movers or differences in a single mover over time may impact how a mover travels along the track. Variations between movers due, for example, to manufacturing tolerances may result in differences in physical engagement of the mover with the track. The variations in physical engagement may result in greater pressure and/or friction being experienced by one of the bearings on the mover than by other bearings. The bearing experiencing the greatest pressure and/or friction may wear more quickly than the other bearings. Similarly, variations in orientation of the track will result in forces due to gravity being exerted on the movers differently. Variations in loading on each mover as it travels along the track will cause varying forces to be exerted on each mover. All of the variations in manufacture, orientation, loading, and the like impact external forces experienced by a mover and may similarly result in greater pressure and/or friction being experienced by one of the bearings on the mover than by other bearings.

Thus, it would be desirable to monitor forces exerted at multiple locations on a mover.

Further, wear in bearings or rollers over time may increase variations between different movers or change orientation of a single mover over time. Wear on the track, such as a dent on a rail, or varying transition distances between track segments may further impact how a mover travels along the track.

Thus, it would be desirable to have real-time feedback corresponding to bearing performance, and to monitor changes in bearing performance over time.

BRIEF DESCRIPTION

According to one embodiment of the invention, a system for monitoring status of a mover in an independent cart system includes multiple sensors, a control circuit, and a transmitter. The independent cart system includes multiple movers configured to travel along a track. The sensors are mounted on the movers, and each sensor is configured to generate at least one feedback signal corresponding to an operating condition of the mover. The control circuit is mounted on the mover. The control circuit is configured to receive the at least one feedback signal from each of the sensors and to generate a data packet including a value corresponding to the operating condition monitored from each of the sensors. The transmitter is mounted on the mover. The transmitter is configured to receive the data packet from the control circuit and to transmit the data packet to a receiver located external from the mover.

According to another embodiment of the invention, a system for monitoring status of multiple bearings on a mover in an independent cart system includes multiple sensors, a control circuit, and a transmitter. The sensors are mounted on the mover, and each sensor is mounted proximate one of the bearings on the mover. Each sensor is configured to generate at least one feedback signal corresponding to an operating condition of a corresponding bearing by which each of the sensors is mounted. The control circuit is mounted on the mover. The control circuit is configured to receive the at least one feedback signal from each of the sensors and to generate a data packet including a value for the at least one feedback signal corresponding to the operating condition of the corresponding bearing monitored from each of the sensors. The transmitter is mounted on the mover. The transmitter is configured to receive the data packet from the control circuit and to transmit the data packet to a receiver located external from the mover.

According to still another embodiment of the invention, a method for monitoring status of a mover in an independent cart system includes generating at least one feedback signal from each of multiple sensors mounted on the mover. The at least one feedback signal corresponds to an operating condition of the mover and is received from each of the sensors at a control circuit mounted on the mover. The control circuit generates a data packet including at least one value corresponding to the operating condition monitored by each of the sensors. The data packet is transmitted from a transmitter mounted on the mover to a receiver located external from the mover.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
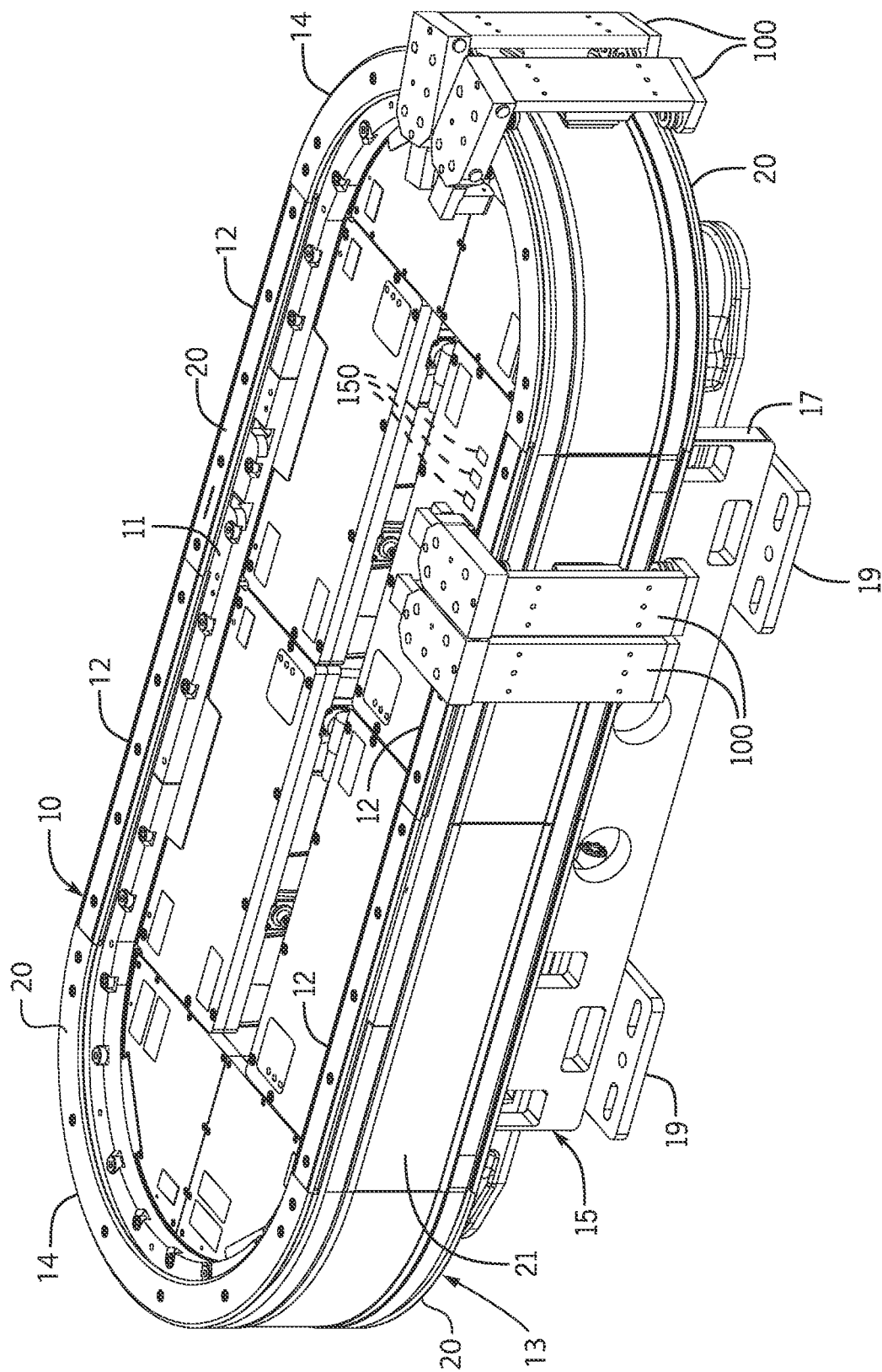
FIG. 1 is a perspective view of an exemplary linear cart system incorporating multiple movers travelling along a closed curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description. The subject matter disclosed herein describes a system and method of monitoring forces exerted at multiple locations on a mover. Multiple sensors are mounted on each mover at multiple locations. Each sensor detects an operating condition of the mover at the location on the mover at which it is mounted. According to one embodiment of the invention, at least one accelerometer and at least one strain gauge are mounted to the mover. According to one aspect of the invention, multiple strain gauges may be mounted to the mover, where each strain gauge is mounted proximate to one of the bearings of the mover. Each strain gauge generates a feedback signal corresponding to a deformation of the material measured at the location of the sensor. From the measured deformation of material, a force acting on the mover at the location of the sensor may be determined. The strain gauges, therefore, can be used to monitor forces exerted at multiple locations on the mover. According to one aspect of the invention, the forces exerted at multiple locations on the mover may be monitored in real time to determine bearing performance. The forces may also be monitored over a duration of time to observer changes in bearing performance over that duration.

Each sensor is configured to generate a feedback signal corresponding to the measured strain. It is contemplated that the feedback signals, additional processed signals, or a combination thereof may be transmitted from each mover to a remote device. Each mover travels along the track of the independent cart system. The remote device is preferably a stationary device mounted external from the track and may, for example, provide a visual interface for a user on which the real-time forces experienced at each location on the mover are displayed. On a smaller track, a communication bus may be mounted around the track and each cart may include a brush, configured to slide along the communication bus and to establish a "wired" communication path between the cart and the remote device. However, with branches and/or an increased size in the track, a wired communication path becomes impractical and a wireless communication path is preferred. Each mover may include a wireless communication device in communication with the sensors and with the remote device to transfer data directly from the sensors to the remote device. Optionally, intermediate communication nodes may be established periodically along the track allowing a wireless communication device on each mover to communicate to one of the nodes. Each node may, in turn, be connected via a wired connection, a wireless connection, or a combination thereof to the remote device. Each node may serve as a gateway to transfer data between the carts and the remote device.

In one embodiment of the invention, it is contemplated that power for each of the sensors and for the communication device is provided by a battery mounted on the cart. According to another embodiment of the invention, it is contemplated that power for each of the sensors and for the communication device is provided via a wireless power transfer system. The wireless power transfer system may use, for example, inductive or optical coupling between a power source mounted on or adjacent to the track, where the power source is configured to emit energy to a pickup device mounted on the cart. The pickup device is configured to receive the emitted energy when it is range of the power source. Multiple power sources may be stationed around the track or, optionally, a power rail may be mounted continuously along the track and a power pick-up may be inductively coupled to the power rail to continuously receive power on the cart from the wireless power transfer system. The cart may have an energy storage device in which energy transferred to the cart is stored until a sensor, control circuit, or communication device requires energy for activation.

Figure 2:
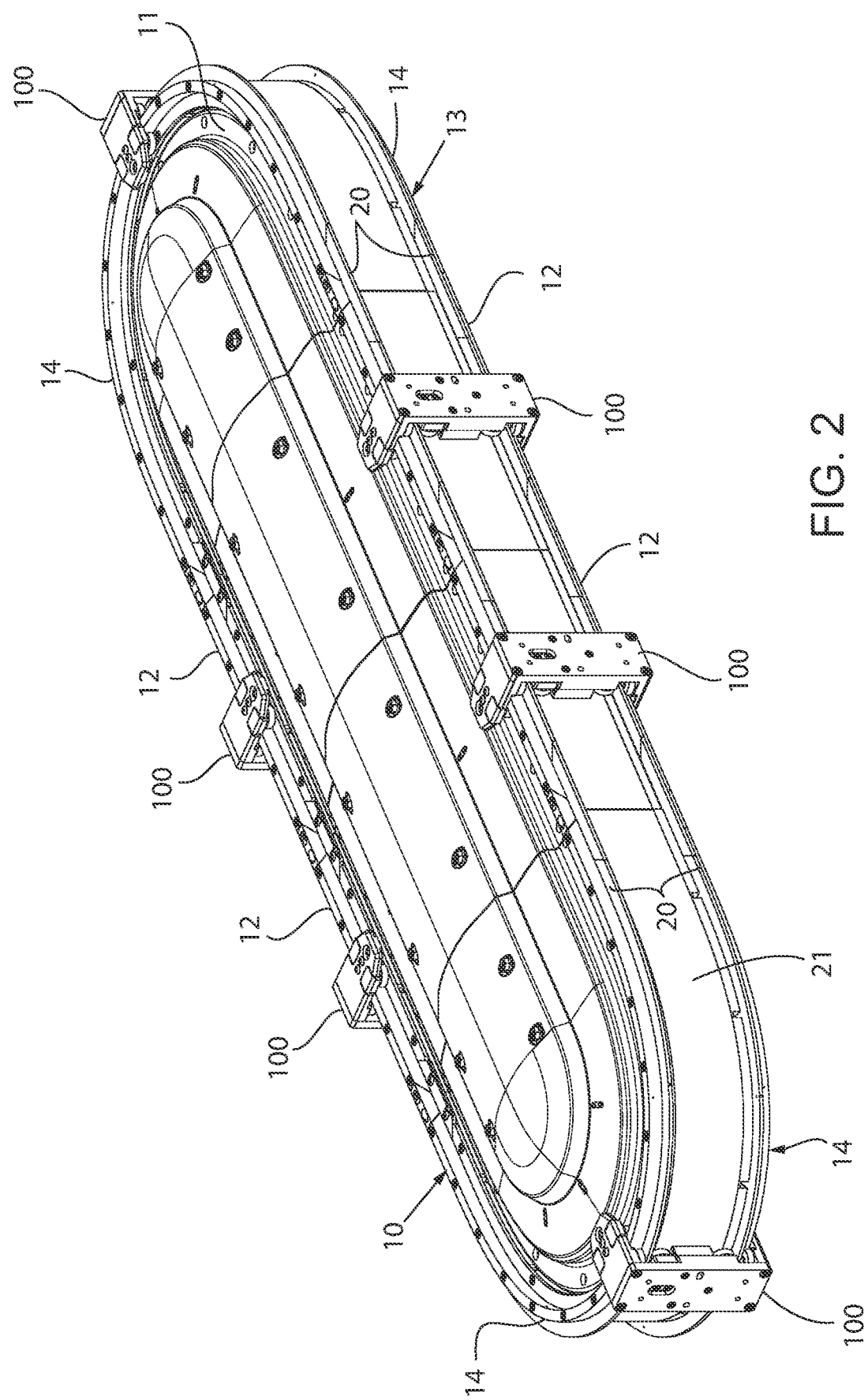
FIG. 2 is a perspective view of an exemplary linear cart system incorporating multiple movers travelling along a closed curvilinear track according to another embodiment of the present invention.
Figure 3:
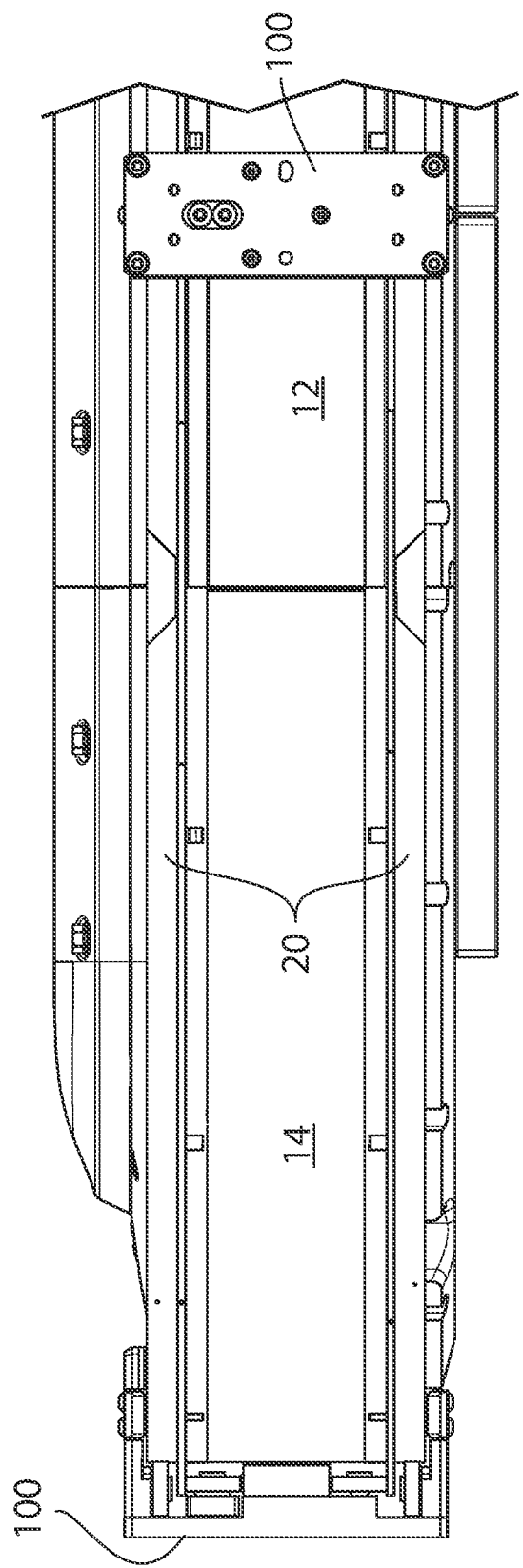
FIG. 3 is a partial side elevation of the linear cart system of FIG. 2.

Turning initially to FIGS. 1-3, two embodiments of an exemplary transport system for moving articles or products are illustrated. The transport system includes a track 10 made up of multiple segments 12, 14. According to the illustrated embodiments, the segments define a generally closed loop supporting a set of movers 100 movable along the track 10. The illustrated tracks 10 each include four straight segments 12 with two straight segments 12 located along each side of the track and spaced apart from the other pair. The tracks 10 also include four curved segments 14 where a pair of curved segments 14 is located at each end of the track 10 to connect the pairs of straight segments 12. The four straight segments 12 and the four curved segments 14 form a generally oval track and define a closed path over which each of the movers 100 may travel. It is understood that track segments of various sizes, lengths, and shapes may be connected together to form a track 10 without deviating from the scope of the invention.

In FIG. 1, the track 10 is oriented in a horizontal plane and supported above the ground by a base 15 extending vertically downward from the track 10. The base 15 includes a pair of generally planar support plates 17, located on opposite sides of the track 10, with mounting feet 19 on each support plate 17 to secure the track 10 to a surface. In FIG. 2, the track 10 is shown without a base. It is contemplated that the tracks 10 may be installed in different orientations, such as sloped or vertical, and include different shaped segments including, but not limited to, straight segments, inward bends, outward bends, up slopes, down slopes and various combinations thereof. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. The movers 100 will travel along the track and take various orientations according to the configuration of the track 10 and the relationships discussed herein may vary accordingly.

Each track segment 12, 14 includes a number of independently attached rails 20 on which each mover 100 runs. According to the illustrated embodiments, rails 20 extend generally along the outer periphery of the track 10. A first rail 20 extends along an upper surface 11 of each segment and a second rail 20 extends along a lower surface 13 of each segment. It is contemplated that each rail 20 may be a singular member, which may be molded, extruded, or machined as a single rail member, or each rail 20 may be assembled and formed from multiple members. It is also contemplated that the cross section of the rails 20 may be circular, square, rectangular, or any other desired cross-sectional shape without deviating from the scope of the invention. The rails 20 generally conform to the curvature of the track 10 thus extending in a straight path along the straight track segments 12 and in a curved path along the curved track segments 14. The rails 20 may be thin with respect to the dimensions of the track 10 and span only a partial width of the surface of the track 10 on which it is attached.

Figure 5:
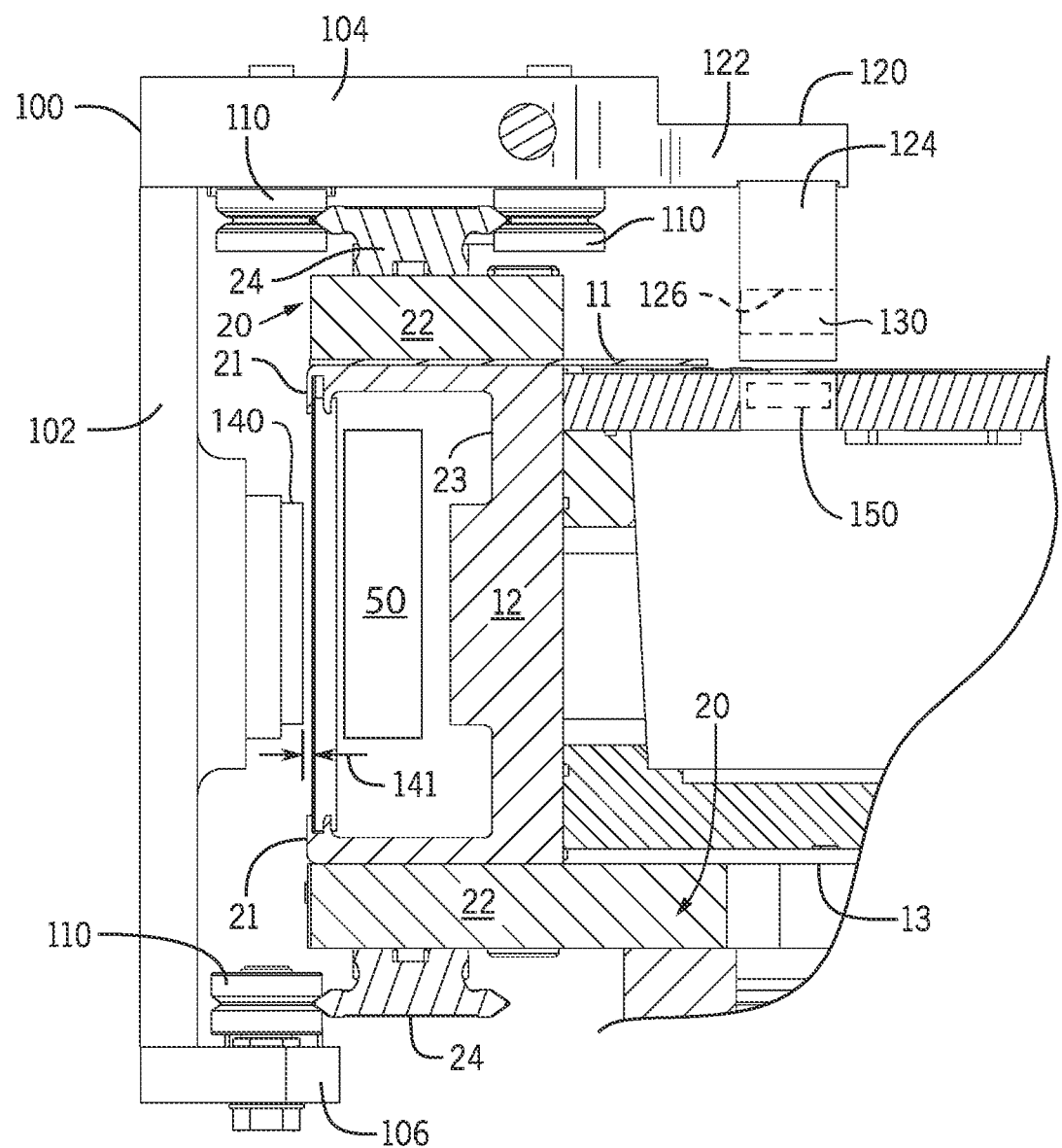
FIG. 5 is a partial sectional view of the transport system of FIG. 1.

With reference also to FIG. 5, a first embodiment of the rail 20 includes a base portion 22 mounted to the track segment and a track portion 24 along which the mover 100 runs. Each mover 100 includes complementary rollers 110 to engage the track portion 24 of the rail 20 for movement along the track 10. Each side of the track portion 24 is wedge-shaped and each roller 110 includes a complementary groove configured to receive the wedge-shaped side of the track portion.

Figure 7:
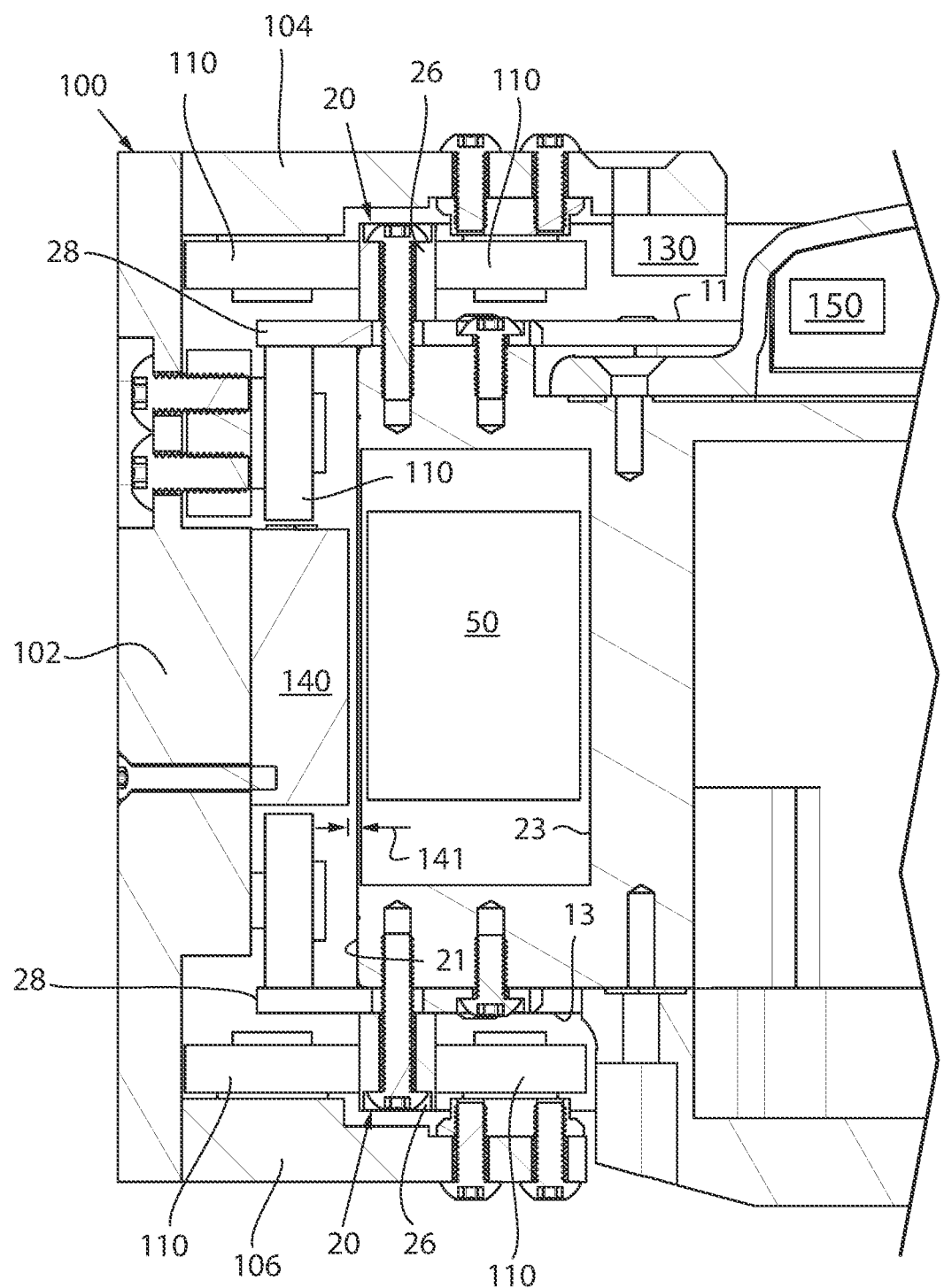
FIG. 7 is a partial sectional view of the transport system of FIG. 2.

With reference also to FIG. 7, a second embodiment of the rail 20 includes two track portions 26, 28, where a first track portion 26 and a second track portion 28 each have a generally rectangular sectional area. The first track portion 26 of the upper rail 20 is positioned on the top surface 11 of the track and first and second rollers 110 engage each side of the first track portion 26 of the upper rail. The second track portion 28 of the upper rail 20 protrudes from the side of the track segment orthogonally to the orientation of the first track portion 26. A third roller 110 engages one surface of the second track portion 28 of the upper rail. The first track portion 26 of a lower rail 20 similarly has a generally rectangular sectional area and is oriented on the lower surface 13 of the track and fourth and fifth rollers 110 engage each side of the first track portion 26 of the lower rail. The second track portion 28 of the lower rail 20 protrudes from the side of the track segment orthogonally to the orientation of the first track portion 26, and a sixth roller 110 engages one surface of the second track portion 28 of the lower rail.

Figure 4:
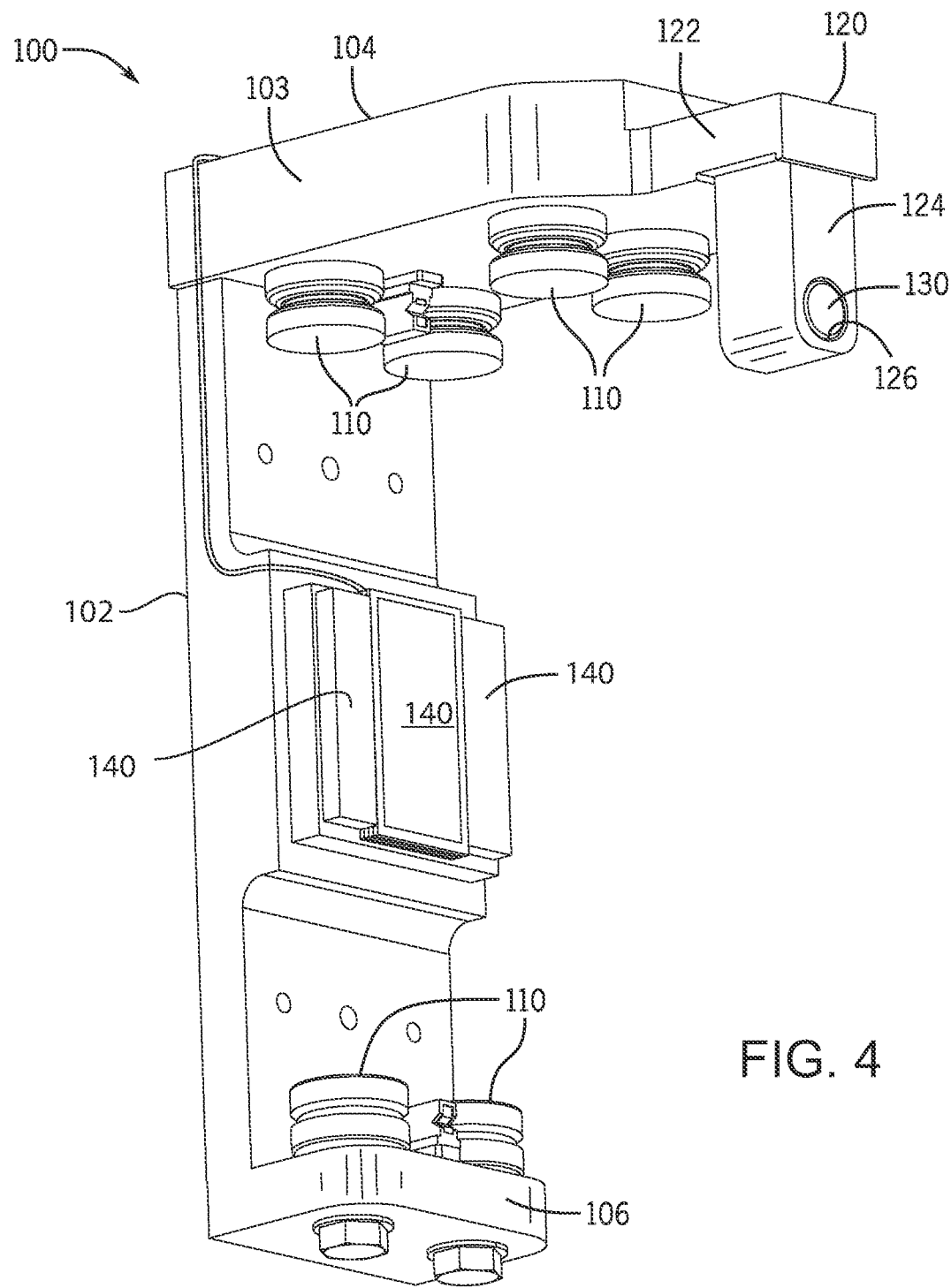
FIG. 4 is a perspective view of a mover from the transport system of FIG. 1.

One or more movers 100 are mounted to and movable along the rails 20 on the track 10. With reference again to FIGS. 4 and 5, a first embodiment of an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. The top member 104 includes a first segment 103, extending orthogonally from the side member 102 for the width of the rail 20, which is generally the same width as the side member 102. A set of rollers 110 are mounted on the lower side of the first segment 103 and are configured to engage the track portion 24 of the rail 20 mounted to the upper surface 11 of the track segment. According to the illustrated embodiment two pairs of rollers 110 are mounted to the lower side of the first segment 103 with a first pair located along a first edge of the track portion 24 of the rail and a second pair located along a second edge of the track portion 24 of the rail 20. The first and second edges and, therefore, the first and second pairs of rollers 110 are on opposite sides of the rail 20 and positively retain the mover 100 to the rail 20. The bottom member 106 extends generally orthogonal to the side member 102 at a bottom end of the side member 102 and extends for a distance sufficient to receive a third pair of rollers 110 along the bottom of the mover 100. The third pair of rollers 110 engage an outer edge of the track portion 24 of the rail 20 mounted to the lower surface 13 of the track segment. Thus, the mover 100 rides along the rails 20 on the rollers 110 mounted to both the top member 104 and the bottom member 106 of each mover 100. The top member 104 also includes a second segment 120 which protrudes from the first segment 103 an additional distance beyond the rail 20 and is configured to hold a position magnet 130. According to the illustrated embodiment, the second segment 120 of the top member 104 includes a first portion 122 extending generally parallel to the rail 20 and tapering to a smaller width than the first segment 103 of the top member 104. The second segment 120 also includes a second portion 124 extending downward from and generally orthogonal to the first portion 122. The second portion 124 extends downward a distance less than the distance to the upper surface 11 of the track segment but of sufficient distance to have the position magnet 130 mounted thereto. According to the illustrated embodiment, a position magnet 130 is mounted within a recess 126 on the second portion 124 and is configured to align with a sensor 150 mounted within the top surface 11 of the track segment.

With reference again to FIG. 7, a second embodiment of an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. A first set of rollers 110 are mounted on the lower side of the top member 104 and are configured to engage either side of the first track portion 26 of the rail 20 mounted to the upper surface 11 of the track segment. According to the illustrated embodiment two pairs of rollers 110 are mounted to the lower side of the top member 104 with a first pair located along a first side of the first track portion 26 and a second pair located along a second side of the first track portion 26 of the upper rail 20. A third pair of rollers 110 are mounted on the side member 102 and extend below the second track portion 28 of the upper rail. The bottom member 106 extends generally orthogonal to the side member 102 at a bottom end of the side member 102 and extends for a distance sufficient to receive a fourth and fifth pair of rollers 110 along the bottom of the mover 100. The fourth and fifth pair of rollers 110 each engage one side of the first track portion 26 of the lower rail 20. A sixth pair of rollers 110 are mounted on the side member 102 and extend above the second track portion 28 of the lower rail. The rollers 110 act together to engage the various surfaces of the rails 20 to both allow the mover 100 to travel along the rails 20 and to maintain the orientation of the mover 100 with respect to the track 10. According to the illustrated embodiment, a position magnet 130 is mounted within the top member 104 and is configured to align with a sensor 150 mounted within the top surface 11 of the track segment.

With reference to both FIGS. 5 and 7, a linear drive system is incorporated in part on each mover 100 and in part within each track segment 12, 14 to control motion of each mover 100 along the segment. Coils 50 (see also FIG. 8) mounted along the length of the track 10 serve as first drive members. Each mover 100 includes a second drive member 140 which is configured to interact with electromagnetic fields generated by the coils 50 to propel the mover 100 along the track 10. It is contemplated that the drive members 140 on each mover 100 may be drive magnets, steel back iron and teeth, conductors, or any other suitable member that will interact with the electromagnetic fields generated by the coils 50. Commonly, the drive member 140 on each mover 100 includes permanent magnets which emit a magnetic field. The magnetic field generated by the drive member 140 on each mover 100 improves the mover interaction with the electromagnetic field generated by the coils 50 in comparison to a magnetically salient structure that has no magnetic field. For convenience, the invention will be discussed with respect to drive magnets 140 being used as the drive member within each mover 100. However, it is understood that the other magnetically salient structures may be employed without deviating from the scope of the invention.

Figure 8:
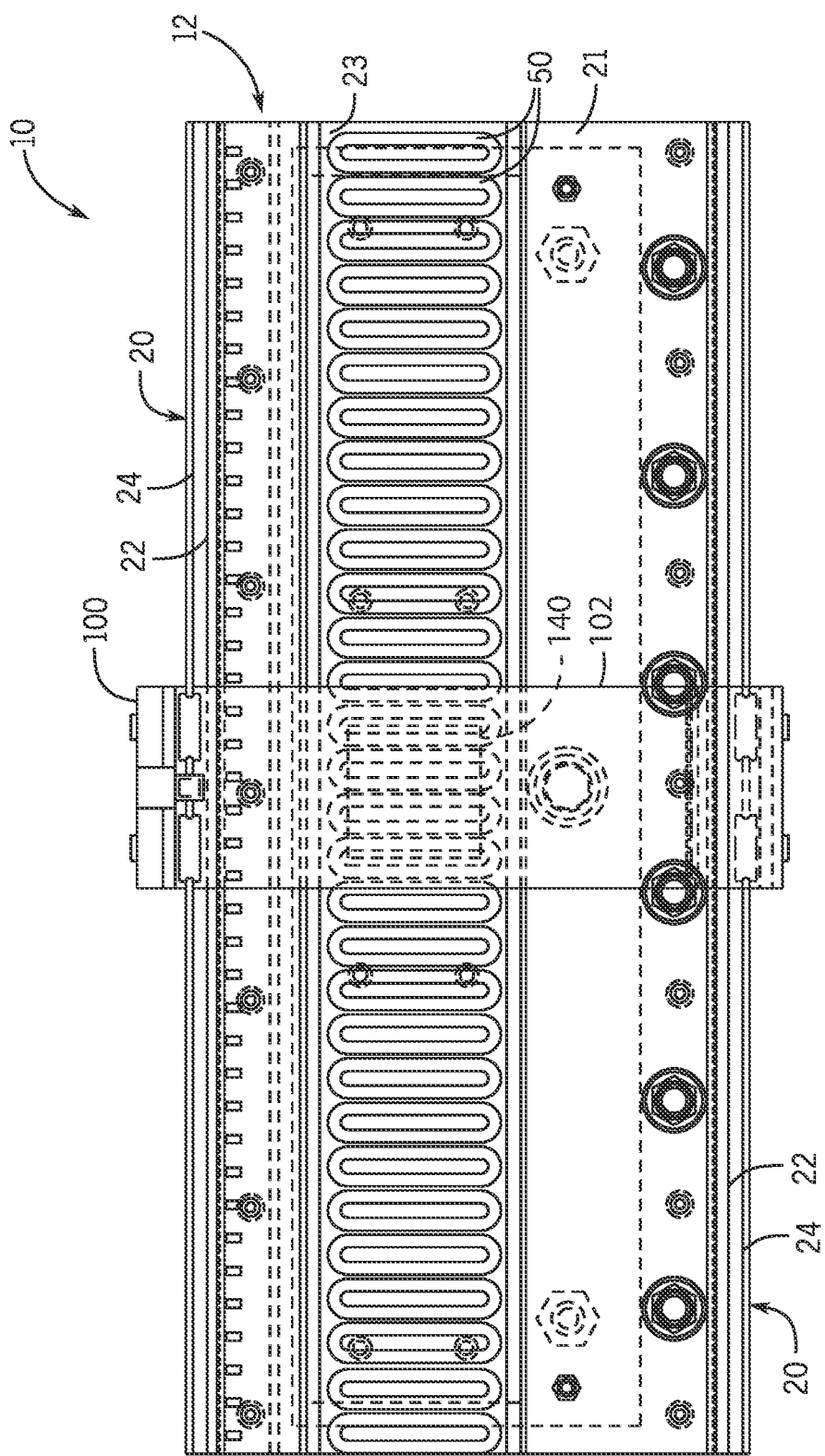
FIG. 8 is a partial side elevation view of one segment of one embodiment of the linear cart system of FIG. 1 illustrating activation coils distributed along one surface of the track segment.

With reference to FIG. 8, a series of coils 50 are positioned along the length of the track 10. Each mover 100 includes at least one drive magnet 140 configured to interact with an electromagnetic field generated in the coils. Successive activation of the coils 50 establishes a moving electromagnetic field that interacts with the magnetic field generated by each permanent magnet 140 mounted on the movers 100 and that causes the mover 100 to travel along the track 10. Controlled voltages are applied to each coil 50 to achieve desired operation of the movers. The drive magnets 140 are mounted on the inner surface of the side member 102 and when mounted to the track 10 are spaced apart from a series of coils 50 extending along the track 10. As shown in FIGS. 5 and 7, an air gap 141 is provided between each set of drive magnets 140 and the coils 50 along the track 10. According to the illustrated embodiment, each coil 50 is placed in a channel 23 extending longitudinally along one surface of the track segment 12. The electromagnetic field generated by each coil 50 spans the air gap 141 and interacts with the drive magnets 140 mounted to the mover 100 to control operation of the mover 100.

Figure 9:
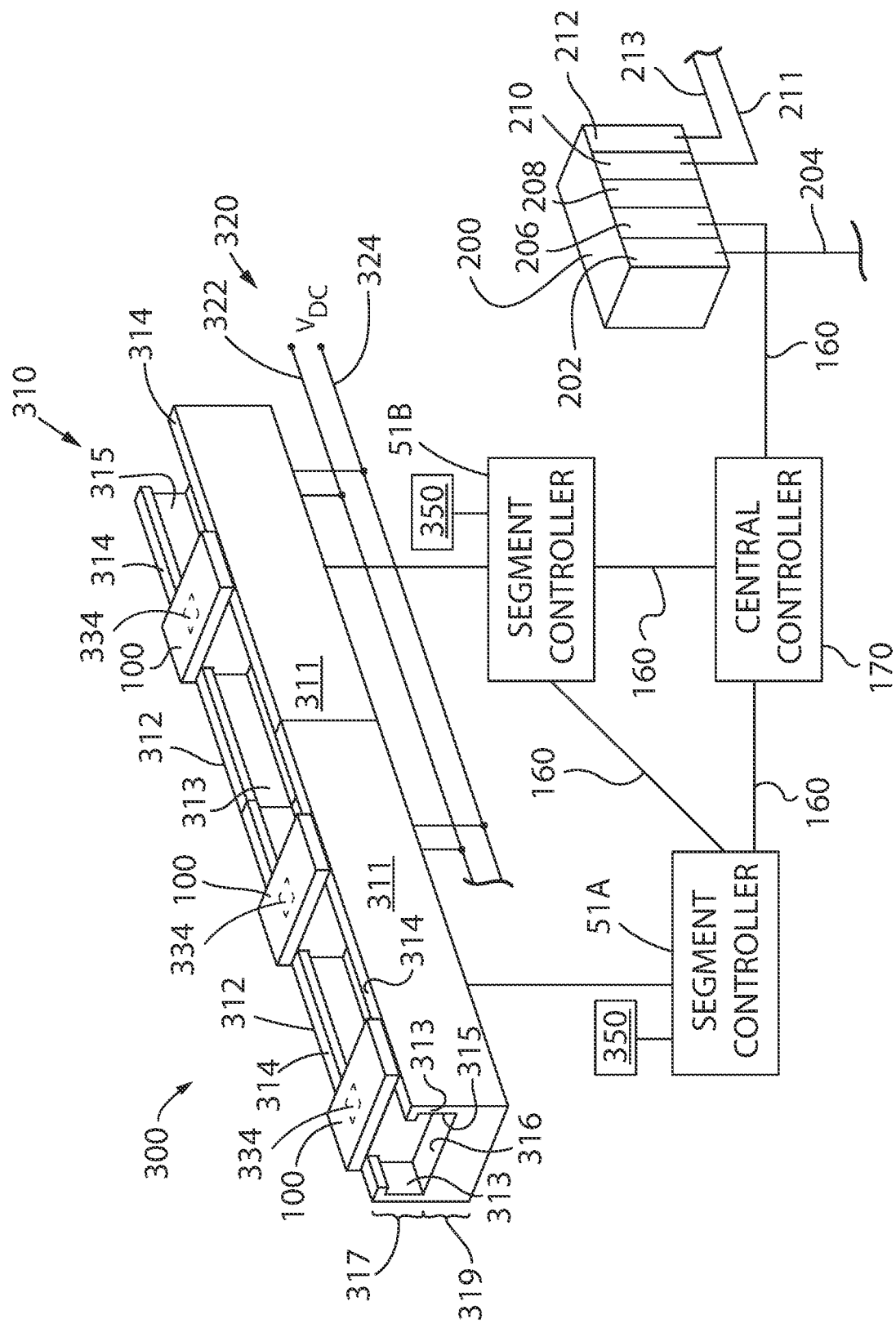
FIG. 9 is an exemplary control system for a linear cart system incorporating one embodiment of the present invention.

Turning next to FIG. 9, a portion of another exemplary independent cart transport system for moving articles or products is illustrated. The illustrated system includes a track 310 made up of multiple segments 312. Rather than traveling along the sides of the track, as shown in FIG. 1, the illustrated movers 100 travel along a channel in the track 310. The channel is defined by a bottom surface 316 and a pair of opposing side walls 313. Rails 314 are placed along the length of the upper surface of each side wall 313 and are configured to support and engage the mover 100 as it travels along the track 310. Power is delivered to segments 312 via a DC bus 320 extending along the track 310. The DC bus 320 includes a positive rail 322 and a negative rail 324 where any suitable voltage potential is provided between the positive and negative rails to energize the coils 50.

The portion of the system illustrated in FIG. 9 includes two straight segments 312 and further illustrates an exemplary control system connected to the independent cart transport system. A segment controller 51 is provided within each track segment 312 to regulate current flow to the coils 50 forming the portion of the linear drive system in each track segment 312. Optionally, each segment controller 51 may also be responsible for all, or a portion of, the motion control of each mover 100 as it travels along the corresponding segment 312. According to one embodiment of the invention, the segment controllers 51 may be mounted together in a control cabinet. A cable, multiple cables, separate conductors, or a combination thereof extend from the control cabinet to each segment 12, 14 to deliver current to the coils 50 and to receive feedback signals, for example, from position sensors 150. In smaller systems, each segment controller 51 and an industrial controller 200 may be included in a single control cabinet. Depending on the size and layout of the track 10, additional control cabinets may be distributed around the track and a portion of the segment controllers 51 located in a control cabinet proximate the track segment 12, 14 they control. Separate control cabinets and controllers within a cabinet are communicatively connected via the network medium 160. Although illustrated as blocks in FIG. 9 external to the track segments 312, the illustration is to facilitate illustration of interconnects between controllers. According to still another embodiment, it is contemplated that each segment controller 51 may be mounted in the lower portion 319 of the track segment 312. Each segment controller 51 is in communication with an adjacent segment controller 51 and a central controller 170 which is, in turn, in communication with an industrial controller 200. According to yet another embodiment, the central controller 170 may be removed and the functions of the central controller 170 incorporated into the segment controllers 51, the industrial controller 200, or a combination thereof, and each segment controller 51 may communicate directly with the industrial controller 200.

The industrial controller 200 may be, for example, a programmable logic controller (PLC) configured to control elements of a process line stationed along the track 10. The process line may be configured, for example, to fill and label boxes, bottles, or other containers loaded onto or held by the movers 100 as the travel along the line. In other embodiments, robotic assembly stations may perform various assembly and/or machining tasks on workpieces carried along by the movers 100. The exemplary industrial controller 200 includes: a power supply 202 with a power cable 204 connected, for example, to a utility power supply; a communication module 206 connected by a network medium 160 to the other controllers 51, 170; a processor module 208; an input module 210 receiving input signals 211 from sensors or other devices along the process line; and an output module 212 transmitting control signals 213 to controlled devices, actuators, and the like along the process line. The processor module 208 may identify when a mover 100 is required at a particular location and may monitor sensors, such as proximity sensors, position switches, or the like to verify that the mover 100 is at a desired location. The processor module 208 transmits the desired locations of each mover 100 to a central controller 170 or to the respective segment controllers 51 where the receiving controller operates to generate commands for the current required in each coil 50 of the corresponding segment controller 51 to control motion of each mover 100. Optionally, the industrial controller 200 may include a module in one of the slots of the chassis or embedded as a routine executing within the processor module 208 to perform a portion of the command generation and the processor module 208 may transmit a current command to a segment controller rather than a desired location.

Figure 10:
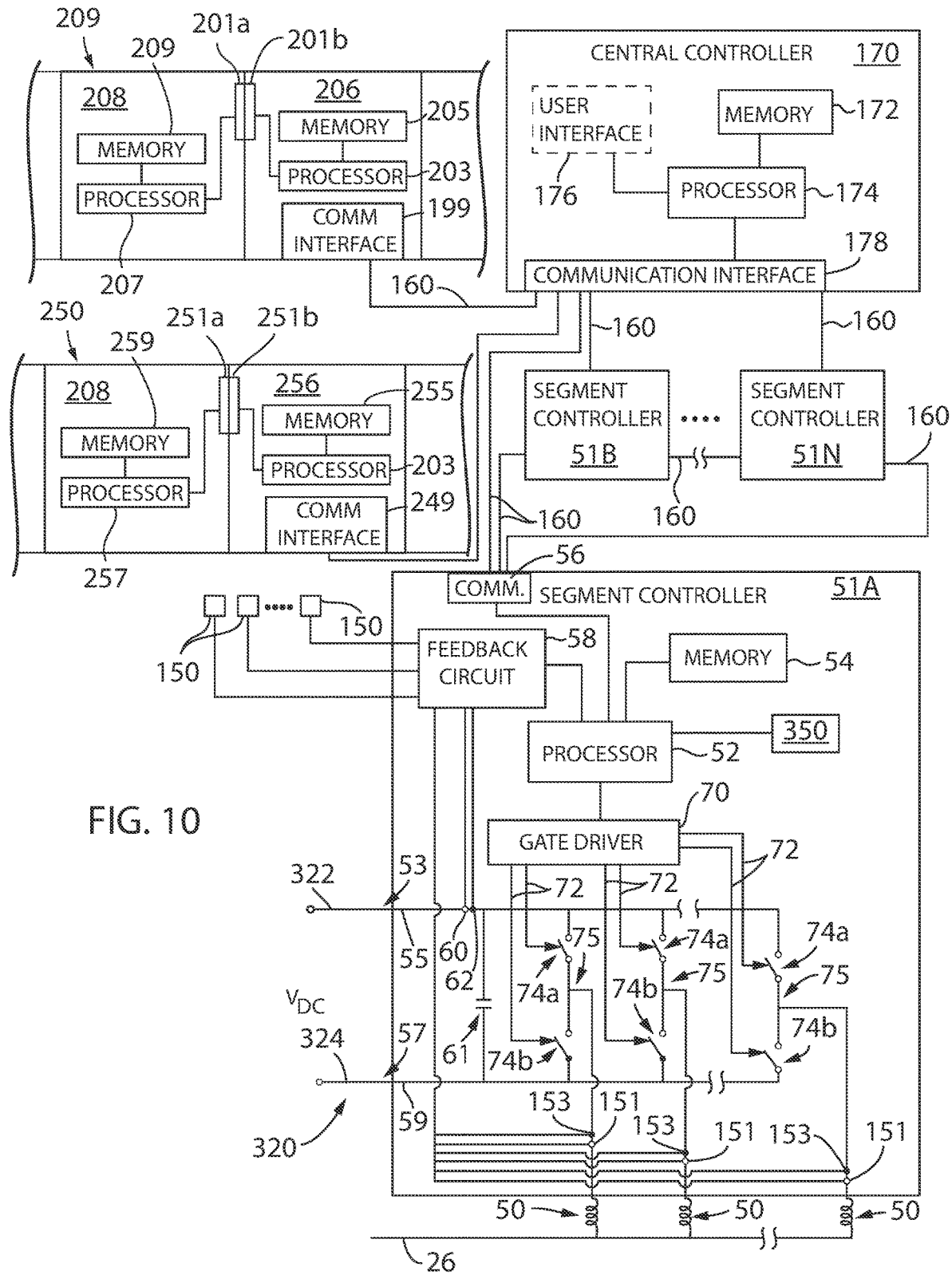
FIG. 10 is a block diagram representation of the control system of FIG. 9.

With reference also to FIG. 10, each module in the industrial controller 200 may include its own memory and processor and be configured to execute one or more routines corresponding to the desired operation of the respective module. The portion of the industrial controller illustrated in FIG. 10, shows a first processor 207 and a first memory device 209 located in the processor module 208 and a second processor 203 and a second memory 205 located in the communication module 206. A backplane connects each module within the industrial controller 200 and backplane connectors 201a, 201b are shown connecting the two modules. Although illustrated as directly connecting the two modules, the backplane is a communication bus extending along the chassis of the industrial controller and each backplane connector 201 for a module engages a complementary backplane connector on the communication bus aligned with the slot on the chassis in which the module is inserted. A communication interface 199 within the communication module 206 is configured to connect to the industrial network 160.

The central controller 170 includes a processor 174 and a memory device 172. It is contemplated that the processor 174 and memory device 172 may each be a single electronic device or formed from multiple devices. The processor may be a microprocessor. Optionally, the processor 174 and/or the memory device 172 may be integrated on a field programmable array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention.

The central controller 170 includes one or more programs stored in the memory device 172 for execution by the processor 174. The central controller 170 can receive instructions for coordinating with industrial processes or machines. In one aspect, known as "centralized" control, the central controller 170 can determine one or more motion profiles for the movers 100 to follow along the track 10. A program executing on the processor 174 is in communication with each segment controller 51 on each track segment via a network medium 160. The central controller 170 may transfer a command signal to the segment controller 51 in each track segment to control energization of the coils 50. The central controller 170 may receive feedback signals corresponding to the identification and/or location of movers 100 along each track segment and control motion of the movers 100 directly from the central controller 170. In one embodiment of the invention, it is contemplated that the central controller 170 may be implemented within the industrial controller 200 as either a portion of the control program executing in the processor module 208 or as a dedicated motion control module inserted within one of the slots of the industrial controller 200.

In another aspect, known as "distributed" control, the central controller 170 may be configured to transfer the desired motion commands, or a portion thereof, from the central controller 170 to each of the segment controllers 51. The motion commands identify one or more desired movers 100 to be positioned at or moved along each track segment 312. The central controller 170 may distribute motion commands to each segment controller 51 according to the mover 100 located at or proximate to the track segment 312. The corresponding segment controller 51 for each track segment 312 may, in turn, determine the appropriate command signals for each mover 100 and transmit the command signals to one or more power segments in each track segment to control energization of the coils 50. Distributed control can minimize the amount of communication in the system by allowing segment controllers 51, rather than the central controller 170, to control driving each mover 100 along the track 310. In one embodiment of the invention, it is contemplated that the central controller 170 may be implemented within the industrial controller 200 as either a portion of the control program executing in the processor module 208 or as a dedicated motion control module inserted within one of the slots of the industrial controller 200.

A position feedback system provides knowledge of the location of each mover 100 along the length of the track segment 12, 14 to the segment controller 51. In one embodiment, the position feedback system can include one or more position magnets 130 mounted to the mover 100 and an array of sensors 150 spaced along the track segment 12, 14. With reference again to FIG. 1, for convenience, only a few position sensors 150 are illustrated along one track segment 12. It is contemplated that the position sensors 150 would continue along each track segment 12, 14 and for the entire length of the track 10. The sensors 150 are positioned such that each of the position magnets 130 are proximate to the sensor as the mover 100 passes each sensor 150. The sensors 150 are a suitable magnetic field detector including, for example, a Hall Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 150 outputs a feedback signal provided to the segment controller 51 for the corresponding track segment 12 on which the sensor 150 is mounted. The feedback signal may be an analog signal provided to a feedback circuit 58 which, in turn, provides a signal to the processor 52 which corresponds to the magnet 130 passing the sensor 150.

The segment controller 51 also includes a communication interface 56 that receives communications from the central controller 170, from adjacent segment controllers 51 in a path, and the industrial controller 200. The communication interface 56 extracts data from the message packets on the communication network and passes the data to a processor 52 executing in the segment controller 51. The processor may be a microprocessor. Optionally, the processor 52 and/or a memory device 54 within the segment controller 51 may be integrated on a field programmable array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 51 receives the motion profile or desired motion of the movers 100 and utilizes the motion commands to control movers 100 along the track segment 312 controlled by that segment controller 51.

Each segment controller 51 generates switching signals to generate a desired current and/or voltage at each coil 50 in the track segment 312 to achieve the desired motion of the movers 100. The switching signals 72 control operation of switching devices 74 for the segment controller 51. According to the illustrated embodiment, the segment controller 51 includes a dedicated gate driver module 70 which receives command signals from the processor 52, such as a desired voltage and/or current to be generated in each coil 50 and generates switching signals 72. Optionally, the processor 52 may incorporate the functions of the gate driver module 70 and directly generate the switching signals 72. The switching signals 72 are provided to the power conversion segment in each track segment 312, where each power conversion segment includes multiple power switching devices 74. The switching devices 74 may be a solid-state device that is activated by the switching signal, including, but not limited to, transistors, thyristors, or silicon-controlled rectifiers.

In one embodiment, the processor 52 can also receive feedback signals from sensors providing an indication of the current operating conditions within the power segment or of the current operating conditions of a coil 50 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 322. The segment controller 51 also receives feedback signals corresponding to the operation of coils 50 connected to the power segment. A voltage sensor 153 and a current sensor 151 are connected in series with the coils 50 at each output of the power section. The voltage sensor 153 generates a voltage feedback signal and the current sensor 151 generates a current feedback signal, where each feedback signal corresponds to the operating condition of the corresponding coil 50. The processor 52 executes a program stored on the memory device 54 to regulate the current and/or voltage supplied to each coil and the processor 52 and/or gate driver 70 generate switching signals 72 which selectively enable/disable each of the switching devices 74 to achieve the desired current and/or voltage in each coil 50. The energized coils 50 create an electromagnetic field that interacts with the drive magnets 140 on each mover 100 to control motion of the movers 100 along the track segment 12.

Figure 11:
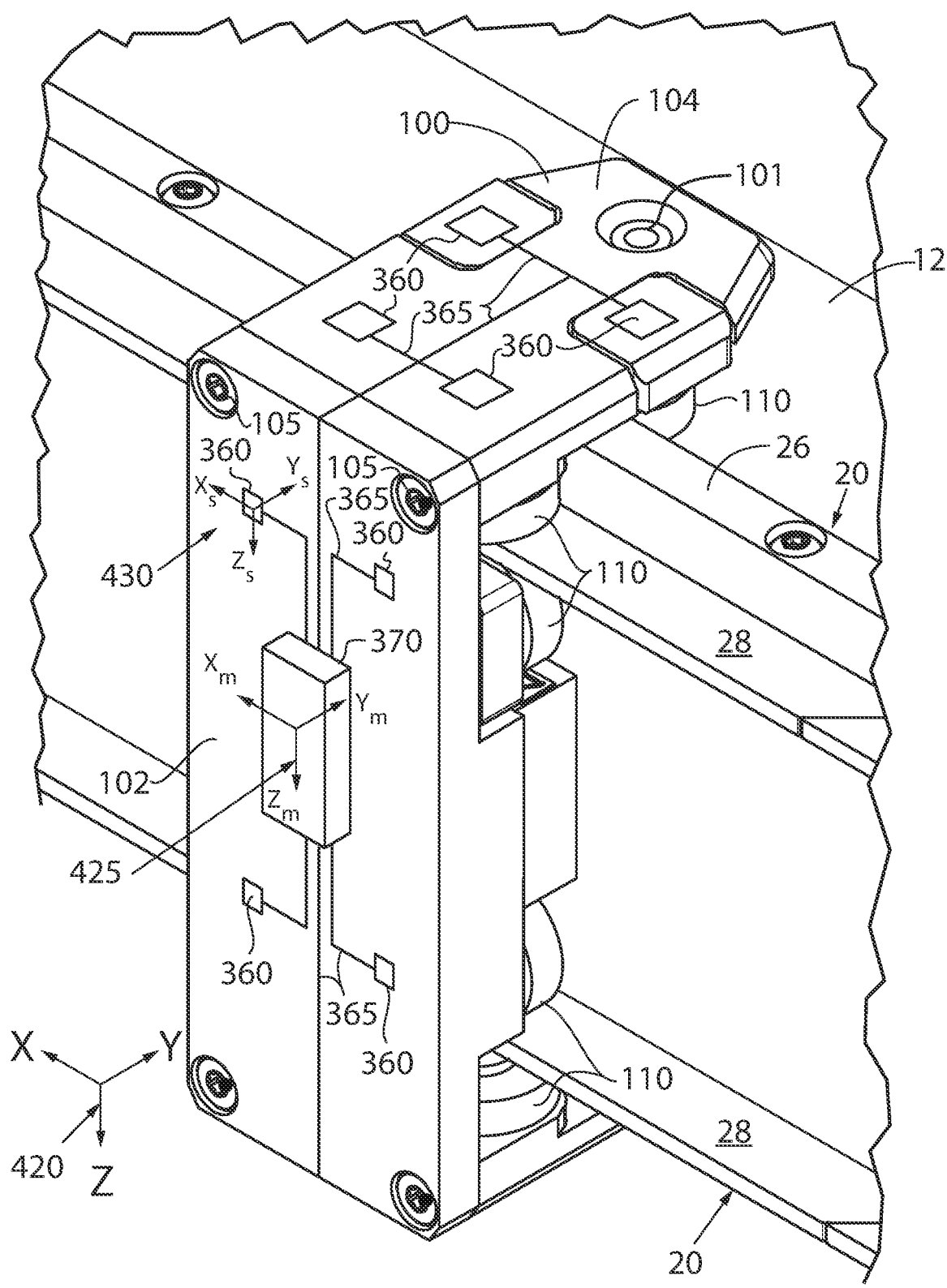
FIG. 11 is a perspective view of a mover from the transport system of FIG. 2, illustrating multiple sensors and a control circuit mounted to the mover according to one embodiment of the invention.

Turning next to FIG. 11, multiple sensors 360 may be mounted to each mover 100 to monitor status of the mover during operation. According to the illustrated embodiment, each sensor 360 is mounted proximate to one of the rollers 110 for the mover 100. The sensor 360 is configured to generate a feedback signal 365 corresponding to a force applied to the respective roller 110 by which it is mounted. The sensor 360 may be, for example, an accelerometer, a gyroscope, or a strain gauge. A force applied to the mover 100 via the linear drive system will generate an acceleration or deceleration of the mover measurable by the accelerometer. The forces experienced by mover 100 as it travels, for example, from the linear drive system, from friction along the rails, or from a load applied to the mover 100 may cause some rotational motion of the mover 100 measurable by the gyroscope and typically provided as a roll, pitch, and yaw of the mover. The force applied to the mover 100 via the linear drive system may cause some deflection (either expansion or contraction) of the material from which the mover 100 is constructed at the location at which the sensor 360 is mounted and which is measurable by the strain gauge. Thus, providing sensors at these locations generates a feedback signal corresponding to a force applied to the mover as seen at the location of the sensor.

As also illustrated in FIG. 11, it is contemplated that one or more coordinate systems may be defined for the independent cart system. A first coordinate system 420 may be a primary reference coordinate system, having a first x-axis, X, a first y-axis, Y, and a first z-axis, Z. This primary reference coordinate system may be used by all devices within the independent cart system or alternate coordinate systems may be utilized according to the application requirements. Each mover 100, for example, may have a mover coordinate system 425 assigned to the mover. An origin for the mover coordinate system 425 is located at a desired position with respect to the mover, and a second x-axis, $X_m$, a second y-axis, $Y_m$, and a second z-axis, $Z_m$, are defined with respect to the origin of the mover coordinate system 425. Further, each sensor 360 may have a sensor coordinate system 430 defined with respect to the location at which the sensor is located. An origin for the sensor coordinate system 430 is located where the sensor is mounted and, as illustrated, may be at the center of each sensor. A third x-axis, $X_s$, a third y-axis $Y_s$, and a third z-axis, $Z_s$, are defined with respect to the origin of the sensor coordinate system 430. The feedback signals 365 generated by each sensor may be assigned to one of the coordinate systems and translated between coordinate systems according to defined offsets between origins of the coordinate systems.

Figure 12:
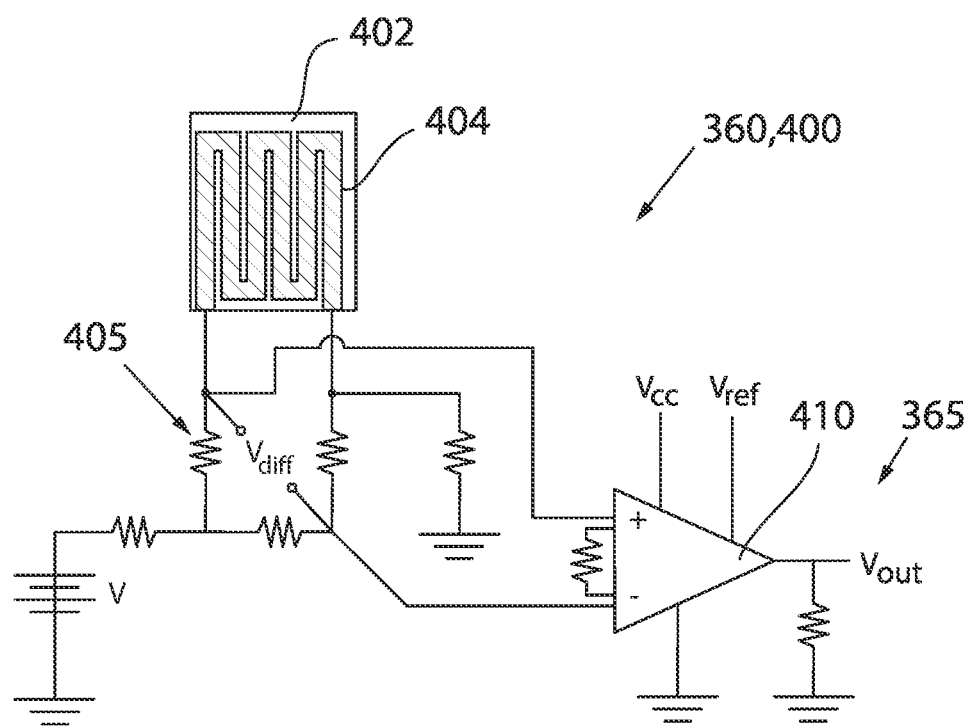
FIG. 12 is a schematic representation of an exemplary strain gauge utilized as one of the sensors of FIG. 11.

As previously indicated, the sensor 360, according to one aspect of the invention, may be a strain gauge 400. With reference also to FIG. 12, an exemplary circuit for the sensor 360 as a strain gauge 400 is illustrated. The illustrated embodiment is an electrical strain gauge constructed from a wheatstone bridge 405 having four resistors. One resistor is a variable resistor, where the resistance changes as a function of the strain present at the location. A conductive trace 404 applied to a foil material 402 is mounted over the location of interest. If strain causes a deformation in the location of interest, the foil 402 mounted on the location is either elongated or compressed as a result of the deformation. The elongation or compression of the foil 402 causes a similar change to the conductive trace 404 mounted on the foil 402. Elongation and compression of the conductive trace 404 will alter the length and width of the conductive trace 404 thereby varying the resistance along the length of the trace 404. A voltage applied across the variable resistance is provided to an amplifier 410, which, in turn, generates the feedback signal 365, corresponding to the strain present on the location. A varying resistance in the strain gauge 400 will cause a varying output voltage, $V_{out}$, corresponding to the varying resistance, to the measured strain, and to force applied at the location.

Figure 13:
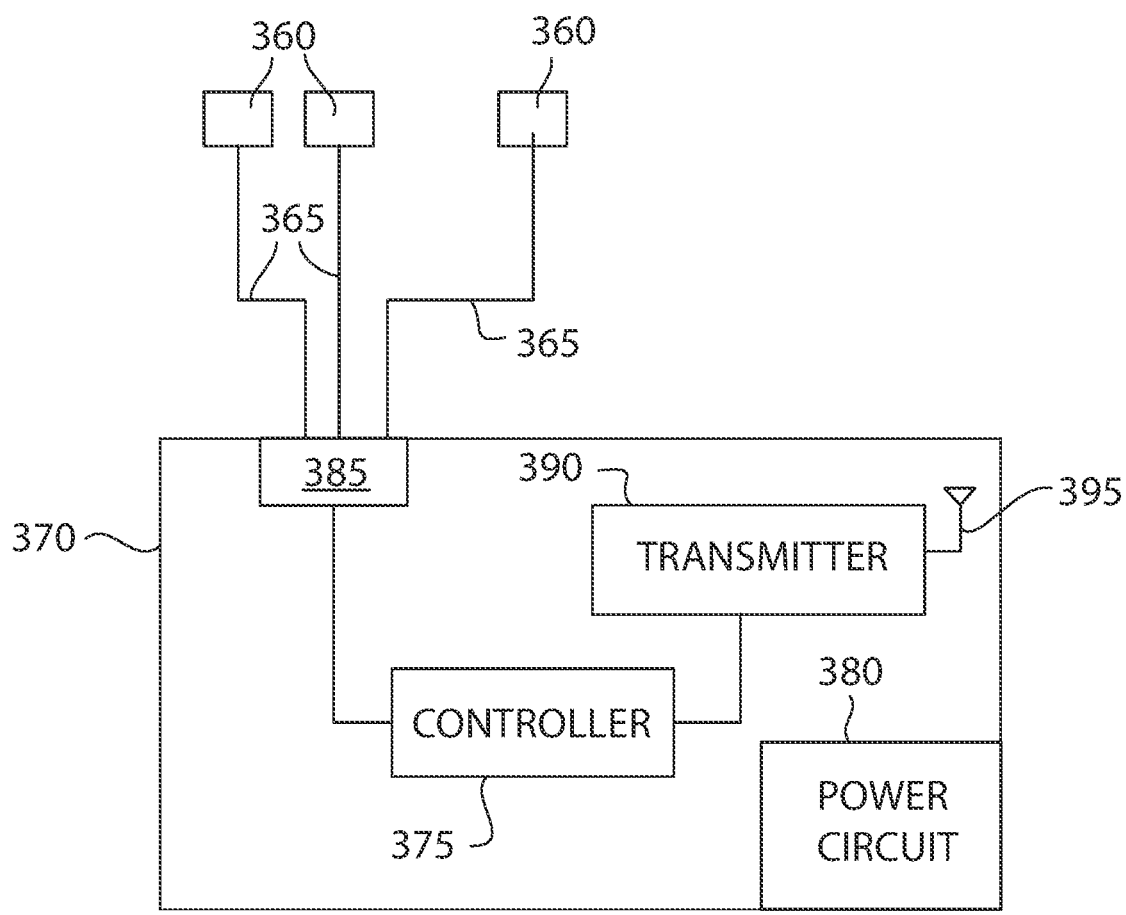
FIG. 13 is a block diagram representation of an exemplary control circuit of FIG. 11.

With reference again to FIG. 11, each sensor 360 generates a feedback signal 365 provided to a control circuit 370 mounted on the mover 100. An enclosure may be provided around the control circuit 370 to protect the control circuit from contamination in a manufacturing environment. With reference also to FIG. 13, the control circuit 370 includes an interface 385 to receive each of the feedback signals 365. It is contemplated that the interface 385 may include analog-to-digital (A/D) converters, amplifiers, buffers, multiplexers, and the like to convert voltage signals output from each sensor 360 to a digital value. Optionally, each sensor 360 may be configured to transmit data in a serial bit stream or as part of a data packet. The interface 385 may include a complementary communication interface to receive the digital data and provide the data values to a controller 375.

The controller 375 is configured to assemble the data received from each sensor into a data packet for transmission from the mover 100. The controller 375 may be a microcontroller, a microprocessor, a field programmable gate array (FPGA), application specific integrated circuit (ASIC), or the like. It is contemplated that the controller 375 is configured to execute a series of instructions stored in memory, where the memory is either on board the controller or is an external device. The controller 375 may be configured to assemble the data directly into a data packet for transmission according to a desired communication protocol. Optionally, the controller 375 may be configured to perform some initial processing, for example, converting a measured strain to a force, as discussed below. The controller 375 may then assemble the processed data into a data packet for transmission according to the desired communication protocol.

The data packet is provided to a transmitter 390 and antenna 395 mounted on the mover to transmit the data from the sensor 360 to a controller located remotely from the mover 100. One or more receivers 350 (see also FIGS. 9-10), may be positioned along the track 10. In some applications, a single receiver 350 may have sufficient range and bandwidth to communicate with each mover 100 traveling along the track 10. In other applications, the number of movers 100 may generate a volume of data packets that exceed the bandwidth of a single receiver 350 or the distance of travel along the track 10 may exceed the range of the receiver. As illustrated in FIG. 9, each segment controller 51 may include or have a receiver 350 connected to the segment controller 51. The transmitter 390 transmits data packets containing either the measured value from the feedback signal or a processed data value, corresponding to the measured value, to a receiver 350 of the segment controller 51 in closest proximity to the mover 100. The receiver 350, in turn, transmits the data to the segment controller 51 or to a central controller 170 or industrial controller 200 in communication with the segment controller 51.

The control circuit 370 also includes a power circuit 380 mounted on the mover 100. The power circuit 380 is configured to supply power to the sensor 360, controller 375, and transmitter 390. According to one embodiment of the invention, the power circuit 380 may include a battery configured to supply power. One or more voltage regulators receive power from the battery and supply a regulated DC voltage, for example, at 3.3 VDC, 5 VDC, 12 VDC, 24 VDC, any other required DC or AC voltage, or a combination thereof. Optionally, the mover 100 includes a pickup device configured to travel along with the mover and to receive power transmitted from a power source external to the mover. The power source may be, for example, a supply coil or supply rail which receives a current that generates an electromagnetic field. The pickup device may be a coil mounted on the mover in which a secondary current is induced as the mover travels through the electromagnetic field. The secondary current is supplied to a voltage regulator circuit to provide the required voltages to each of the devices on the mover or to an energy storage device to store excess energy not required by the devices. If more power is required than may be provided from the pick-up device, energy stored in the energy storage device may supplement the energy supplied from the pick-up coil.

The feedback signals 365 are transmitted to a controller located remote from the mover 100. The controller may be the segment controller 51 controlling the section of track on which the mover is located. Optionally, the controller may be the central controller 170 for the independent cart system or the industrial controller 200 controlling operation of the track and external actuators. It is further contemplated that a dedicated receiver 350 or multiple receivers may be positioned around the track 10 to receive the feedback signals 365 from each mover 100 and the dedicated receiver 350 may relay the information to one of the controllers. The feedback signals may be utilized to monitor bearing wear and/or predict remaining life of bearings at each roller 110 on a mover.

In operation, the force applied to the mover 100 and operating conditions of the mover are monitored at multiple locations by sensors 360 mounted at each location on the mover. Each sensor 360 mounted on the mover 100 generates one or more feedback signals 365 corresponding to a force applied to the mover 100. It is contemplated that each sensor 360 may be a single axis sensor, generating a feedback signal 365 corresponding to one of the axes of the sensor coordinate system 430 or each sensor 360 may be a multiple axis sensor, generating feedback signals 365 corresponding to two or all three axes of the sensor coordinate system 430.

According to one embodiment of the invention, the sensor 360 is a strain gauge 400 configured to monitor deflection of the mover 100 at the location on which the strain gauge is mounted. The feedback signal 365 corresponding to the strain measured by the sensor may be used to determine the force experienced by the mover 100 at the location of the sensor. With equation 1, the measured strain may first by converted to a stress experienced by the mover 100. Young's Modulus is a material property of the mover 100 and is a known value based on the construction of the mover. The value of Young's Modulus for each mover 100 may be stored in memory of one of the controllers and used to convert the measured strain to the value of stress.

$$\sigma_n = E \varepsilon_n \qquad (1)$$

where:
$\sigma_n$ is the stress determined at sensor "n",
$\varepsilon_n$ is the strain measured at sensor "n", and
E is Young's Modulus for the material at the location of sensor "n".

After determining the stress with equation 1, the stress may be converted to a force experienced by the mover at the sensor location by using equation 2. The value of stress previously determined is multiplied by the sectional area of the mover at the location of the sensor to determine a force observed at the location of the sensor.

$$\sigma_n = \frac{F_n}{A} \quad (2)$$

where:
$\sigma_n$ is the stress determined at sensor "n",
$F_n$ is the force observed at the location of sensor "n", and
A is the sectional area of the mover at the location of section "n".

Having determined a force present at each bearing, a controller may be used to monitor real-time performance of a mover 100 or to track performance of the mover over time. According to one aspect of the invention, it is contemplated that the controller monitoring performance may be the segment controller 51 monitoring performance of each mover 100 as the mover 100 travels along the segment controller 51. The segment controller 51 monitors the forces in real-time and may generate a warning or fault message to be transmitted to either the central controller 170 or the industrial controller 200 if a force exceeds a predetermined threshold. Optionally, the segment controller 51 may store value of the forces observed for each mover in the memory 54 for the segment controller. An initial value may be stored during commissioning and changes in the value over time may be monitored. When a difference in the measured value of force (observed under consistent operating conditions) exceeds a predefined threshold, the segment controller 51 may generate a warning or fault message to be transmitted to either the central controller 170 or the industrial controller 200.

According to another aspect of the invention, the controller monitoring performance may be the central controller 170 or the industrial controller 200. If the receivers 350 are connected to each segment controller 51, the segment controllers 51 may be configured to retransmit data packets containing data from the sensors 360 to either the central controller 170 or the industrial controller 200. Optionally, the receivers 350 may be connected directly to the central controller 170 or the industrial controller 200 and the corresponding controller may receive data from the sensors 360 directly from each mover 100. The central controller 170 or industrial controller 200 may be configured to store data from each of the multiple movers 100 in the independent cart system. The controller may monitor the data in real-time or over a duration of time in a manner similar to that discussed above for each segment controller.

The controller configured to monitor performance of the movers 100 in the independent cart system may detect a number of different operating conditions based on the feedback signals from the sensors 360. According to a first aspect of the invention, the controller may be configured to determine a misalignment between adjacent track segments 12. As each mover 100 transitions between a first track segment 12, 14 and a second track segment 12, 14, where the second track segment is adjacent to the first track segment, there should be little or no change in operating performance between track segments. Ideally, each track segment is manufactured identical to one another and there is no change in operating performance as a mover transitions between track segments. However, variations do exist between adjacent track segments due to manufacturing tolerances, assembly tolerances, and the like. In some instances, adjacent track segments 12, 14 may have some misalignment between the two segments. A mover 100 will experience a spike in strain and acceleration as it transitions between the misaligned segments. If the value of the spike in strain and/or acceleration exceeds a predefined threshold, the controller may generate a warning or fault message alerting a technician to the misalignment between adjacent track segments.

Figure 6:
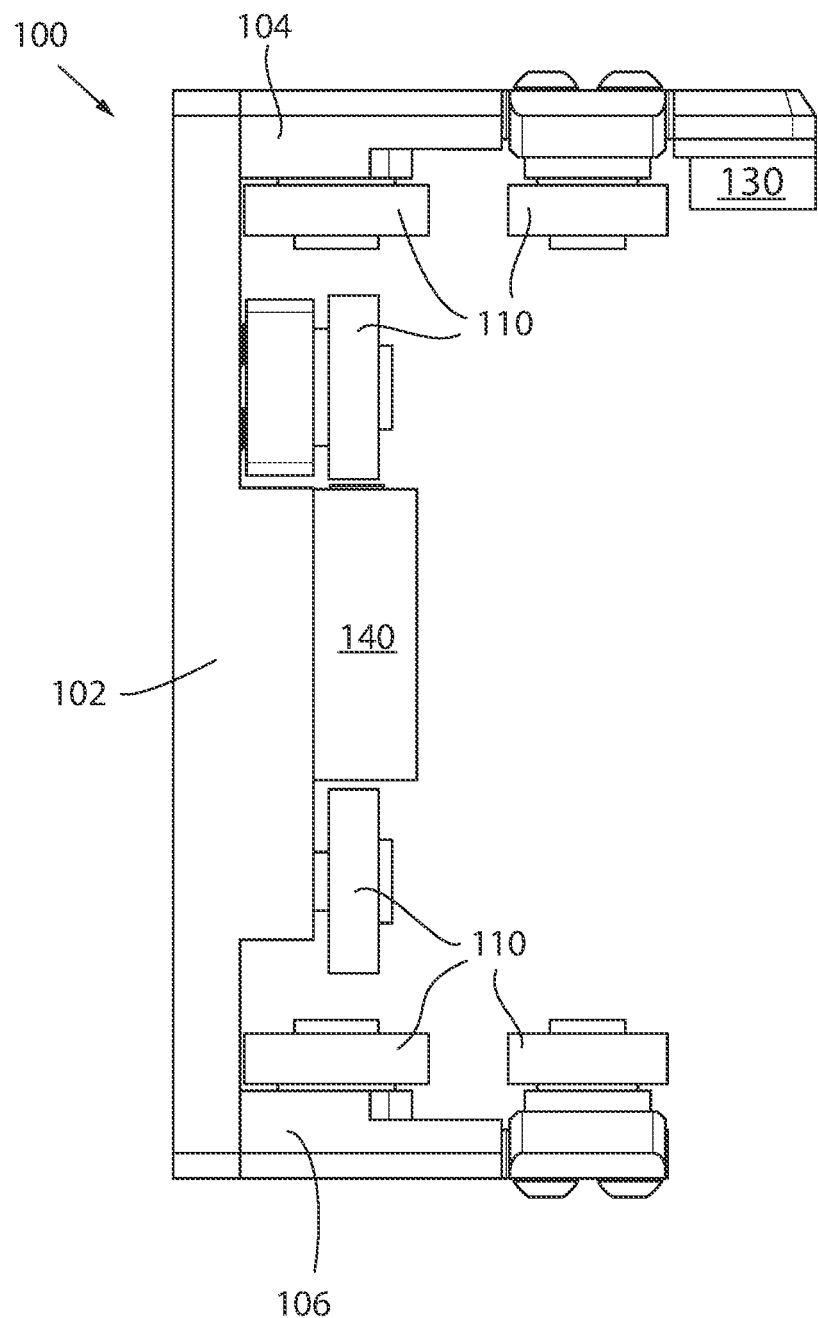
FIG. 6 is a side elevational view of a mover from the transport system of FIG. 2.
Figure 14:
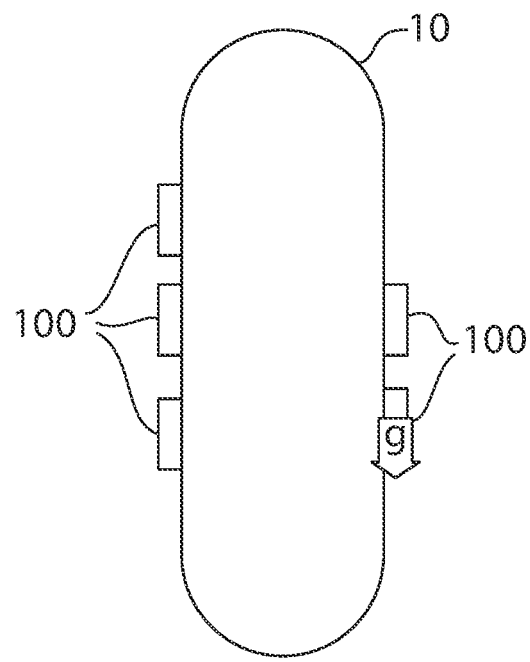
FIG. 14 is a front elevation view of an exemplary track mounted with the major axis of the track positioned in a vertical orientation.
Figure 15:
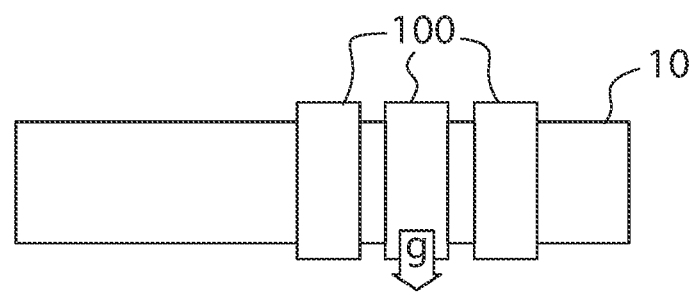
FIG. 15 is a front elevation view of an exemplary track mounted in a horizontal orientation.
Figure 16:
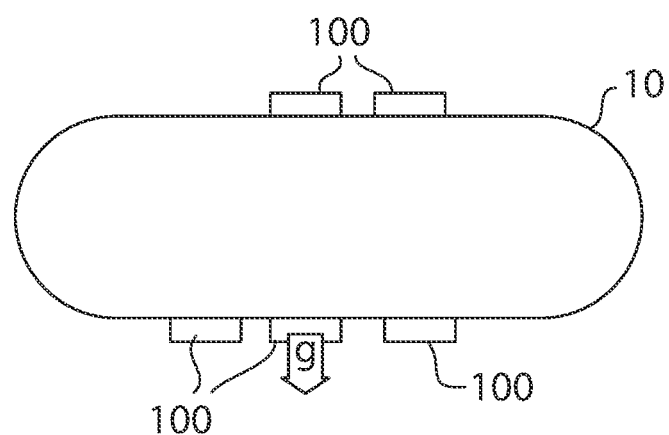
FIG. 16 is a front elevation view of an exemplary track mounted with the minor axis of the track positioned in a vertical orientation.

According to another aspect of the invention, the controller may be configured to determine remaining life of bearings on each roller 110. Each roller 110 may include a ball bearing, roller bearing, or other suitable bearing according to application requirements. The controller may be configured to monitor values detected by strain gauges 400 to determine forces applied to the bearings and further provide an indication of remaining bearing life. With reference to FIGS. 14-16, orientation of the track 10 may impact bearing life. With reference also to FIGS. 6 and 11, it may be observed that rollers 110 engage different portions 26, 28 of the rails 20 with different orientations. A combination of the orientation of each roller 110 on the mover 100 and the orientation of the track 10 will cause different rollers 110 to experience greater forces from gravity, g, than other rollers. With the track mounted in a vertical orientation, as shown in FIGS. 14 and 16, the rollers 110 oriented horizontally in FIG. 6 will experience a greater force due to gravity, g, than the rollers 110 oriented vertically in the same figure. With the track mounted in a horizontal orientation, shown in FIG. 15, the rollers 110 oriented vertically in FIG. 6 and positioned on the lower portion of the mover 100 will engage an upper surface of the portion 28 of the rail 20 protruding from the track segment and experience the greatest force due to gravity, g. Without the application of any other force, the bearings on rollers 110 experiencing greater forces due to gravity will wear quicker than the bearings on other rollers 110. Measurements of the strain observed on the mover by each roller 110 provide an indication of the force experienced by each roller 110 and, in turn, by the bearings on each roller.

The controller may monitor the status of the rollers 110 observing the greatest forces and determine the remaining life of each roller and/or the bearing on each roller. In addition to forces generated by gravity, forces will be exerted on the mover 100 due to acceleration and loading of the mover 100. The memory of the controller may include a look up table corresponding to expected life of a bearing as a result of various forces applied. The controller may maintain a record of the operation of each mover 100 and the forces measured to determine a remaining life of each bearing. When the remaining life drops below a first threshold, a warning message may be generated to alert a technician preventive maintenance is required. If the remaining life drops below a second threshold, a second warning message or a fault message may be generated indicating an imminent failure of the bearing and roller 110 is possible.

According to another aspect of the invention, the orientation of the track may be determined by monitoring the feedback signals 365 from each sensor 360. When the mover is stationary, a force due to gravity will generate a reading from an accelerometer corresponding to a negative nine and eight-tenths meters per second square (−9.8 m/s²) in the direction of gravity. If a multi-axis accelerometer is mounted on the mover 100, the controller may determine orientation of the track 10 based on the axis along which the accelerometer is detecting the −9.8 m/s² reading.

According to still another aspect of the invention, the feedback signals 365 from the sensors 360 may be utilized to determine the presence of a payload on the mover 100. With reference again to FIG. 11, the illustrated mover 100 includes an opening 101 on the upper surface of the mover 100. It is contemplated that the opening 101 has a threaded interior surface, and a fixture (not shown) may be secured to the opening 101 with a bolt, screw, or other threaded fastener. The fixture may be a platform on which a load may be set. Optionally, the fixture may include a gripper, vacuum member, clamp, or other such gripping member to secure a load on the mover 100. The weight of a payload mounted on the mover 100 will exert a downward force on the top member 104 of the mover and a torque on the bolts 105 securing the top member 104 to the side member 102. The force may cause deflection on the top member 104 and/or side member 102 and, in particular near the edges of each member where the top and side members are joined. A strain gauge mounted proximate each roller 110 along the top of the side member 102 or at the rollers 110 along the inward side of the top member 104 will detect the deflection due to the presence of a load on the mover 100. Further, a greater load will cause a greater deflection. The controller (segment controller 51, central controller 170, or industrial controller 200) configured to receive the feedback signal 365 from the strain gauge 400 may utilize a look-up table or execute a calculation to determine a weight of the payload as a function of the additional strain measured when loaded. Thus, each strain gauge may be used not only to detect the presence of a load on each mover, but further be utilized to determine the amount of loading present on the mover 100.

It is yet another aspect of the invention, the feedback signals 365 may be utilized to monitor wear in the independent cart system. During commissioning or during early operation of the mover 100, a first value of the feedback signal 365 may be stored during a particular operation. For example, as the mover 100 travels across a particular location, the strain, stress, or acceleration may be monitored and stored in memory. Optionally, multiple values of the feedback signal 365 may be stored as the mover 100 travels along a length of the track. During subsequent operation of the mover 100, measured values of strain, stress, or acceleration, as observed in the feedback signals 365 may be compared to the stored values. A change in the feedback value over time that exceeds a predefined threshold may indicate excessive wear or damage that has occurred to the mover 100 or to the track segment 12, 14 over which the mover 100 is travelling. A warning or fault message may be generated to alert a technician to the change in value and to the mover 100 and/or to the track segment 12, 14 on which the change in value in occurred, providing an indication of the wear or damage in the independent cart system.

Still another aspect of the invention allows a controller to determine improvements to a motion profiled being executed by the mover 100. As discussed above, each mover 100 is controlled by the linear drive system to travel along the track. The industrial controller 200, central controller 170, segment controller 51, or a combination thereof is operational to generate a motion profile for each mover. The segment controller 51 controls operation of the coils 50 spaced along the track to achieve the desired motion of each mover 100. As a mover 100 travels along the track 10, the feedback signals 365 from each sensor 360 may be periodically stored to obtain a corresponding measured acceleration profile, velocity profile, stress profile, or strain profile corresponding to the motion profile generated by the controller. One of the controllers analyzes the feedback signals 365 stored in memory to identify the greatest value of the acceleration, velocity, stress, or strain. This maximum value of the measured feedback may be compared to a first predefined threshold. Optionally, the controller may analyze the feedback signals 365 to identify a duration of time along the profile during which the values exceed a second predefined threshold. When the measured performance of the mover 100 exceeds an instantaneous maximum value or when the measured performance of the mover 100 exceeds a second maximum value for a predefined duration, the controller may generate a message alerting a technician to the performance. Optionally, the controller may be further configured to adapt the motion profile being generated to reduce the maximum value or to reduce the sustained value over the duration, thereby reducing the overall stress or strain on the system.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system for monitoring status of a mover in an independent cart system, wherein the independent cart system includes a plurality of movers configured to travel along a track, the system comprising:
   a plurality of sensors mounted on the mover, wherein each of the plurality of sensors is configured to generate at least one feedback signal corresponding to an operating condition of the mover;
   a control circuit mounted on the mover, wherein the control circuit is configured to receive the at least one feedback signal from each of the plurality of sensors and to generate a data packet including a value corresponding to the operating condition monitored from each of the plurality of sensors; and
   a transmitter mounted on the mover, wherein the transmitter is configured to receive the data packet from the control circuit and to transmit the data packet to a receiver located external from the mover.

2. The system of claim 1 wherein at least one of the plurality of sensors is a strain gauge and at least one of the plurality of sensors is an accelerometer.

3. The system of claim 1 wherein each of the plurality of sensors is a strain gauge.

4. The system of claim 3 wherein:
the mover includes a plurality of bearings;
each of the plurality of sensors is mounted proximate one of the plurality of bearings; and
the at least one feedback signal corresponds to a force present on a corresponding bearing by which each of the plurality of sensors is mounted.

5. The system of claim 4 further comprising a controller configured to receive the at least one feedback signal from each of the plurality of sensors and to determine a remaining life for the corresponding bearing by which each of the plurality of sensors is mounted.

6. The system of claim 1 further comprising:
a battery mounted on the mover, wherein the battery is configured to provide power for each of the plurality of sensors, the control circuit, and the transmitter; and
at least one voltage regulator circuit mounted on the mover and configured to transfer power from the battery to each of the plurality of sensors, the control circuit, and the transmitter.

7. The system of claim 1 further comprising:
at least one power pickup device mounted on the mover, wherein the power pickup device is configured to travel with the mover and to receive power transmitted from a stationary power source mounted along a track of the independent cart system; and
at least one voltage regulator circuit mounted on the mover and configured to transfer power from the at least one power pickup device to each of the plurality of sensors, the control circuit, and the transmitter.

8. The system of claim 1 wherein the operating condition corresponding to the at least one feedback signal is selected from one of:
a misalignment between a first segment of the track and a second segment of the track, the second segment positioned adjacent to the first segment;
a remaining life of a bearing for at least one roller mounted on the mover;
an orientation of the track;
a presence of a payload on the mover;
a determination of wear on either the mover or the track; and
a motion profile of the mover.

9. A system for monitoring status of a plurality of bearings on a mover in an independent cart system, the system comprising:
a plurality of sensors mounted on the mover, wherein each of the plurality of sensors is mounted proximate one of the plurality of bearings on the mover and each of the plurality of sensors is configured to generate at least one feedback signal corresponding to an operating condition of a corresponding bearing by which each of the plurality of sensors is mounted;
a control circuit mounted on the mover, wherein the control circuit is configured to receive the at least one feedback signal from each of the plurality of sensors and to generate a data packet including a value for the at least one feedback signal corresponding to the operating condition of the corresponding bearing monitored from each of the plurality of sensors; and
a transmitter mounted on the mover, wherein the transmitter is configured to receive the data packet from the control circuit and to transmit the data packet to a receiver located external from the mover.

10. The system of claim 9 wherein at least one of the plurality of sensors is a strain gauge and at least one of the plurality of sensors is an accelerometer.

11. The system of claim 9 wherein each of the plurality of sensors is a strain gauge.

12. The system of claim 11, wherein the at least one feedback signal corresponds to a force present on the corresponding bearing by which each of the plurality of sensors is mounted.

13. The system of claim 12 further comprising a controller configured to receive the at least one feedback signal from each of the plurality of sensors and to determine a remaining life for the corresponding bearing by which each of the plurality of sensors is mounted.

14. The system of claim 9 further comprising:
a battery mounted on the mover, wherein the battery is configured to provide power for each of the plurality of sensors, the control circuit, and the transmitter; and
at least one voltage regulator circuit mounted on the mover and configured to transfer power from the battery to each of the plurality of sensors, the control circuit, and the transmitter.

15. The system of claim 9 further comprising:
at least one power pickup device mounted on the mover, wherein the at least one power pickup device is configured to travel with the mover and to receive power transmitted from a stationary power source mounted along a track of the independent cart system; and
at least one voltage regulator circuit mounted on the mover and configured to transfer power from the power pickup device to each of the plurality of sensors, the control circuit, and the transmitter.

16. A method for monitoring status of a mover in an independent cart system, the method comprising the steps of:
generating at least one feedback signal from each of a plurality of sensors mounted on the mover, wherein the at least one feedback signal corresponds to an operating condition of the mover;
receiving the at least one feedback signal from each of the plurality of sensors at a control circuit mounted on the mover;
generating a data packet with the control circuit, wherein the data packet includes at least one value corresponding to the operating condition monitored by each of the plurality of sensors; and
transmitting the data packet from a transmitter mounted on the mover to a receiver located external from the mover.

17. The method of claim 16 further comprising the step of receiving the data packet at a controller located remotely from the mover.

18. The method of claim 16 wherein each of the plurality of sensors is a strain gauge.

19. The method of claim 18 wherein:
each mover includes a plurality of bearings;
each of the plurality of sensors is mounted proximate one of the plurality of bearings; and
the at least one feedback signal corresponds to a force present on a corresponding bearing by which each of the plurality of sensors is mounted.

20. The system of claim 19 further comprising the step of determining a remaining life with the controller for the corresponding bearing by which each of the plurality of strain gauges is mounted.

* * * * *